United States Patent [19]

Ramun

[11] 4,106,682
[45] * Aug. 15, 1978

[54] SHEARING TOOL FOR STRUCTURAL MEMBERS

[76] Inventor: Michael Ramun, 3180 Fifth Ave., Youngstown, Ohio 44505

[*] Notice: The portion of the term of this patent subsequent to Nov. 4, 1992, has been disclaimed.

[21] Appl. No.: 682,983

[22] Filed: May 4, 1976

[51] Int. Cl.² ............................................. B26F 3/00
[52] U.S. Cl. .................................... 225/103; 30/277; 125/40
[58] Field of Search .................. 225/103, 104, 105; 30/277; 241/273; 125/40

[56] References Cited

U.S. PATENT DOCUMENTS

| | | | |
|---|---|---|---|
| 1,284,312 | 11/1918 | Glover | 225/103 |
| 1,826,016 | 10/1931 | Naylor et al. | 225/103 X |
| 2,074,906 | 3/1937 | Hausler | 61/53.5 X |
| 2,334,940 | 11/1943 | Le Tourneau | 225/103 |
| 2,846,754 | 8/1958 | Raizk et al. | 225/104 |
| 3,916,520 | 11/1975 | Ramun | 30/277 |

*Primary Examiner*—Frank T. Yost
*Attorney, Agent, or Firm*—Webster B. Harpman

[57] ABSTRACT

A shearing tool for use in dismantling steel structures such as multi-story buildings takes the form of a large heavy inverted U-shaped steel member of a size enabling it to be elevated and dropped on a horizontal floor beam for example adjacent a vertical column to shear the same therefrom.

6 Claims, 3 Drawing Figures

SHEARING TOOL FOR STRUCTURAL MEMBERS

BACKGROUND OF THE INVENTION (1) Field of the Invention

This invention relates to shearing tools such as employed to shear or cut steel beams or columns and the like such as hereinbefore generally cut by cutting torches.

(2) Description of the Prior Art

The only prior art of a comparable nature is the metal cutting tool shown in my U.S. Pat. No. 3,916,520 wherein a weight actuated cutting blade is disclosed for use in cutting steel plate in structures such as large petroleum storage tanks.

This invention discloses an efficient gravity actuated shearing tool that quickly and easily shears structural members including beams, columns and the like to facilitate the dismantling of such structures.

SUMMARY OF THE INVENTION

A shearing tool for structural members comprises a three or a four ton inverted U-shaped device with means on its upper edge for attaching a lifting cable thereto. Floor beams and similar structural members are readily sheared from their supports by dropping the shearing tool thereon adjacent the desired shearing location.

DESCRIPTION OF THE PREFERRED EMBODIMENT

Figure 1:
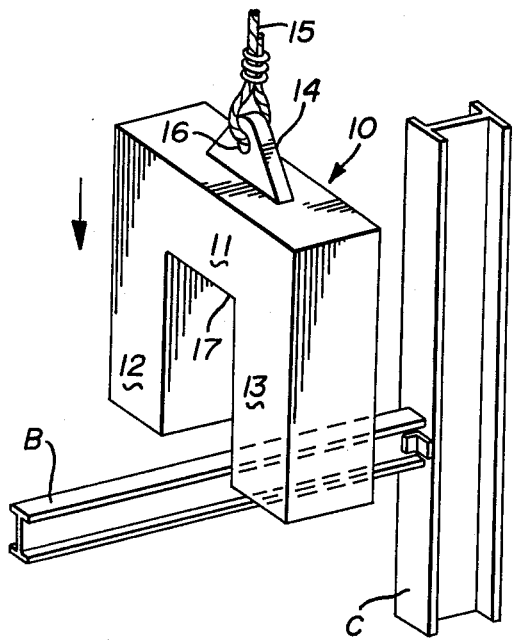
FIG. 1 is a perspective elevation of a vertical column and horizontal beam and the shearing tool in position prior to engaging the same.

In the form of the invention chosen for illustration and description herein the shearing tool consists of an inverted U-shaped steel member generally indicated by the numeral 10 and including a horizontal upper section 11 and a pair of spaced vertically positioned depending sections 12 and 13 formed integrally therewith. The area between the depending vertical sections 12 and 13 is sufficiently large that the shearing tool 10 can move downwardly over a floor beam such as B in FIG. 1 of the drawings with adequate clearance and preferably so as to engage the floor beam 10 adjacent its point of attachment to a vertical column C. The shearing tool is provided on its uppermost surface with an apertured bracket 14 and a cable 15 is illustrated being positioned through an aperture 16 in the apertured bracket 14 and arranged to form an eyelet with respect thereto so that the shearing tool 10 can be lifted as by a crane and dropped on a structural member to be sheared.

Figure 2:
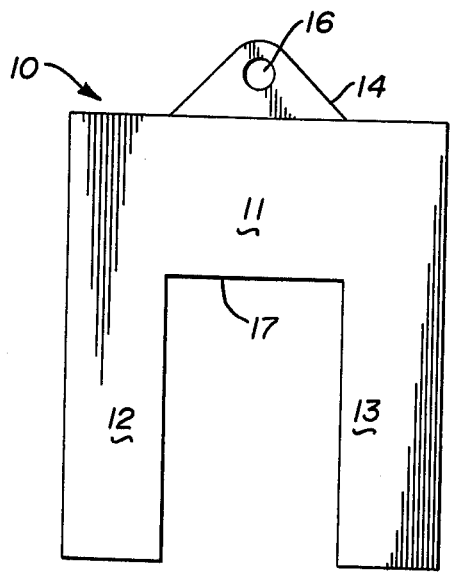
FIG. 2 is a front elevation of the shearing tool.

By referring now to FIG. 2 of the drawings, a front elevation of the shearing tool 10 may be seen and it will be observed that the horizontal upper section 11 of the shearing tool is relatively thicker in its vertical dimension than the horizontal thickness of the depending vertical sections 12 and 13 and that the inverted U-shaped tool thus formed has relatively sharp horizontal corners 17.

Figure 3:
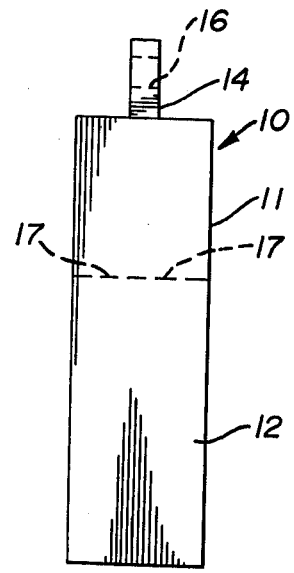
FIG. 3 is a side elevation thereof.

In FIG. 3 of the drawings a side elevation is seen and it will be observed that the width of the horizontal upper section 11 of the shearing tool 10 is substantially similar to the vertical thickness thereof as seen in FIGS. 1 and 2 and heretofore described and it will occur to those skilled in the art that when the shearing tool which weighs substantially four tons in its preferred embodiment, is elevated and positioned immediately above a horizontal beam or other structural member to be sheared from a vertical support or the like and then dropped thereon adjacent the vertical support, the relatively sharp horizontal edges 17 of the vertical section 11 of the shearing tool will shear the beam in a clean shearing action thereby separating it from its support whether it has been welded riveted or otherwise secured thereto.

By again referring to FIG. 1 of the drawings, it will be seen that the horizontal floor beam B is about to be sheared from its supporting vertical column C as the shearing tool 10 moves downwardly thereagainst by gravity as indicated by the arrow.

It will occur to those skilled in the art that various metal structures such as multi-story buildings being dismantled and cut up for melting scrap may be rapidly and inexpensively sheared with the shearing tool disclosed herein.

Although but one embodiment of the present invention has been illustrated and described, it will be apparent to those skilled in the art that various changes and modifications may be made therein without departing from the spirit of the invention and having thus described my invention what I claim is:

1. A shearing tool comprising an inverted U-shaped relatively large heavy steel body member as compared with structural members such as beams in a building being dismantled and including a horizontal upper section, right angular lower horizontal edges on said horizontal upper section and a pair of spaced depending vertical sections integral with said horizontal upper section and means on said horizontal upper section to which a supporting element can be attached whereby the shearing tool may be alternately lifted and dropped so as to move downwardly straddling said structural member to be sheared so as to shear the same upon impact of said horizontal upper section therewith.

2. The shearing tool set forth in claim 1 and wherein said means on said horizontal upper section comprises an upwardly extending apertured bracket.

3. The shearing tool set forth in claim 1 wherein the pair of spaced depending vertical sections define a vertically extending slot of a width greater than that of a structural member to be sheared.

4. The shearing tool set forth in claim 1 and wherein said body member is vertically elongated so that a majority of said tool and the weight thereof lies below the horizontal upper section thereof.

5. The shearing tool set forth in claim 1 and wherein said depending vertical sections are substantially square in cross section and the horizontal upper section has a depth dimension equal to the depth dimension of the vertical sections.

6. The shearing tool set forth in claim 1 wherein the width of the horizontal upper section is substantially four times the width of the depending vertical sections and substantially double the width of the space between said vertical sections.

* * * * *